(12) United States Patent
Hu et al.

(10) Patent No.: US 9,462,492 B2
(45) Date of Patent: Oct. 4, 2016

(54) METHOD AND APPARATUS FOR OBTAINING INFORMATION OF NEIGHBORING CELL

(71) Applicant: Huawei Technologies Co., Ltd., Shenzhen, Guangdong (CN)

(72) Inventors: Chunli Hu, Shenzhen (CN); Hailong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/640,782

(22) Filed: Mar. 6, 2015

(65) Prior Publication Data

US 2015/0181443 A1    Jun. 25, 2015

Related U.S. Application Data

(63) Continuation of application No. PCT/CN2012/081242, filed on Sep. 11, 2012.

(51) Int. Cl.
*H04W 24/02* (2009.01)
*H04W 36/00* (2009.01)

(52) U.S. Cl.
CPC ......... *H04W 24/02* (2013.01); *H04W 36/0061* (2013.01)

(58) Field of Classification Search
CPC .................. H04W 24/02; H04W 36/0061
See application file for complete search history.

(56) References Cited

U.S. PATENT DOCUMENTS

2010/0040019 A1    2/2010 Tinnakornsrisuphap et al.
2010/0075681 A1    3/2010 Olofsson et al.
2011/0070897 A1*   3/2011 Tang et al. .................. 455/456.1
2011/0263282 A1*  10/2011 Rune et al. ................... 455/507
2012/0051274 A1    3/2012 Song
2012/0142356 A1*   6/2012 Serravalle et al. ........... 455/436
2012/0196617 A1    8/2012 Sun
2012/0230296 A1    9/2012 Hapsari et al.

(Continued)

FOREIGN PATENT DOCUMENTS

CN    101651874 A    2/2010
CN    102088756 A    6/2011

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 v11.2.0, Jun. 2012, 201 pages.

(Continued)

*Primary Examiner* — Leon Flores

(57) ABSTRACT

Embodiments of the present invention provide a method and an apparatus for obtaining information of a neighboring cell. The method includes: obtaining a Cell Global Identifier CGI of a neighboring cell of a base station; and obtaining, according to the CGI of the neighboring cell and a correspondence between all or part of information in the CGI and a public land mobile network PLMN information set, a PLMN information set corresponding to the neighboring cell. With the method and the apparatus for obtaining information of a neighboring cell according to the embodiments of the present invention, a base station can implement an ANR function well.

12 Claims, 7 Drawing Sheets

(56) References Cited

U.S. PATENT DOCUMENTS

2012/0315913 A1    12/2012   Yang et al.
2015/0189522 A1*    7/2015   Hu et al. ................ 455/434

FOREIGN PATENT DOCUMENTS

| CN | 102484826 A | 5/2012 |
| EP | 2 255 563 B1 | 2/2012 |
| RU | 2011105431 A | 8/2012 |
| WO | WO 2009/120127 A1 | 10/2009 |
| WO | WO 2010/009162 A1 | 1/2010 |
| WO | WO 2010/047647 A1 | 4/2010 |

OTHER PUBLICATIONS

"Clarification of multiple PLMN-IDs supported by eNB", ZTE, 3GPP TSG-RAN3 Meeting #73, Aug. 22-26, 2011, 2 pages, R3-112146.

"Clarification on the requirement for network sharing", ZTE, 3GPP TSG-RAN WG3 #74, Nov. 14-18, 2011, 3 pages, R3-112900.

"3rd Generation Partnership Project; Technical Specification Group Services and System Aspects; Network Sharing; Architecture and fuctional description (Release 11)", 3GPP TS 23.251 V11.2.0, Jun. 2012, 29 pages.

\* cited by examiner

METHOD AND APPARATUS FOR OBTAINING INFORMATION OF NEIGHBORING CELL

CROSS-REFERENCE TO RELATED APPLICATIONS

This application is a continuation of International Application No. PCT/CN2012/081242, filed on Sep. 11, 2012, which is hereby incorporated by reference in its entirety.

TECHNICAL FIELD

The present invention relates to the field of communications, and in particular, to a method and an apparatus for obtaining information of a neighboring cell.

BACKGROUND

When an operator independently constructs a network, a high spectrum license expenditure and a network deployment cost are required, and the operator further needs to be confronted with a pressure of providing a relatively high network coverage requirement in a short term and a challenge of site deployment, and therefore, a network sharing concept is proposed. All cooperation or sharing to any extent involved in a plurality of operators (or third parties) for telecommunications network infrastructures or network devices may be referred to as network sharing, where sharing of a telecommunications network infrastructure may include sharing of a site infrastructure such as a site address, an equipment room facility, a tower, and a power supply device, and sharing of a network device may include facility sharing related to a telecommunications network device such as a base station, a transmission device, or a core network device. The network sharing can save an investment cost greatly, accelerate a network construction pace, shorten a network construction period, and enlarge operator network coverage.

Currently, diversified sharing forms among a plurality of operators exist. Operators intend to save a network construction cost as much as possible and also have a control right on a wireless network, and therefore, an increasing number of operators begin to concern radio access network sharing. The radio access network sharing gradually becomes an important technology that is increasingly concerned and is successfully commercial. In a network in which a radio access network is shared and used by a plurality of operators, users of the plurality of operators can share and use the same base station/cell.

Therefore, in the 3GPP TS 36.300, an Automatic Neighbor Relation ("ANR") function is defined, so as to implement operations such as automatic addition and deletion of a neighbor relation. The ANR function depends on a standard ANR terminal, where the standard ANR terminal refers to a terminal capable of detecting a Cell Global Identifier ("CGI") of a neighboring cell after detecting a configuration message delivered by a base station.

However, because a network sharing scenario exists, it needs to learn a Public Land Mobile Network ("PLMN") identifier (Identifier, "id") list corresponding to a cell, and neither an ordinary terminal nor a standard ANR terminal can learn the information, so that a base station cannot implement an ANR function well.

SUMMARY

Embodiments of the present invention provide a method and an apparatus for obtaining information of a neighboring cell, so that a PLMN information set corresponding to a neighboring cell of a base station can be obtained, and the base station can implement an ANR function well.

In a first aspect, a method for obtaining information of a neighboring cell is provided and includes:
obtaining a Cell Global Identifier CGI of a neighboring cell of a base station; and
obtaining, according to the CGI of the neighboring cell and a correspondence between all or part of information in the CGI and a public land mobile network PLMN information set, a PLMN information set corresponding to the neighboring cell.

With reference to the first aspect, in a first possible implementation manner of the first aspect, when the method is executed by an operator support system OSS, the obtaining a CGI of a neighboring cell of a base station includes:
receiving identifier information of the neighboring cell sent by the base station, and determining a CGI included in the identifier information of the neighboring cell as the CGI of the neighboring cell, where the CGI included in the identifier information of the neighboring cell is obtained for the neighboring cell and sent to the base station by a user equipment; and
the method further includes:
sending the PLMN information set corresponding to the neighboring cell to the base station.

With reference to the first aspect, in a second possible implementation manner of the first aspect, when the method is executed by an OSS, the obtaining a CGI of a neighboring cell of a base station includes:
receiving identifier information of the neighboring cell sent by the base station, where a CGI and a PCI that are included in the identifier information of the neighboring cell are obtained by a user equipment for the neighboring cell and are sent to the base station;
when a first CGI is found according to the CGI and the PCI that are included in the identifier information of the neighboring cell and cell information, determining whether the first CGI is the same as the CGI included in the identifier information of the neighboring cell, where the first CGI and the CGI included in the identifier information of the neighboring cell have the same base station id and cell id, and a PCI corresponding to the first CGI is the same as the PCI included in the identifier information of the neighboring cell;
when the first CGI is different from the CGI included in the identifier information of the neighboring cell, determining the first CGI as the CGI of the neighboring cell; and
when the first CGI is the same as the CGI included in the identifier information of the neighboring cell, determining the CGI included in the identifier information of the neighboring cell as the CGI of the neighboring cell; and
the method further includes:
sending the PLMN information set corresponding to the neighboring cell to the base station, and sending information used for indicating the CGI of the neighboring cell.

With reference to the first aspect, in a third possible implementation manner of the first aspect, when the method is executed by the base station, the obtaining a CGI of a neighboring cell of a base station includes:
receiving a CGI sent by a user equipment, where the CGI sent by the user equipment is obtained for the neighboring cell by the user equipment; and
determining the CGI obtained for the neighboring cell by the user equipment as the CGI of the neighboring cell.

With reference to the first aspect, the first possible implementation manner of the first aspect, the second possible implementation manner of the first aspect, and the third possible implementation manner of the first aspect, in a fourth possible implementation manner of the first aspect, the obtaining, according to the CGI of the neighboring cell and a correspondence between all or part of information in the CGI and a PLMN information set, a PLMN information set corresponding to the neighboring cell includes:

determining, according to the CGI of the neighboring cell and a correspondence between the CGI and a PLMN information set, the PLMN information set corresponding to the neighboring cell.

With reference to the first aspect, the first possible implementation manner of the first aspect, the second possible implementation manner of the first aspect, and the third possible implementation manner of the first aspect, in a fifth possible implementation manner of the first aspect, the obtaining, according to the CGI of the neighboring cell and a correspondence between all or part of information in the CGI and a PLMN information set, a PLMN information set corresponding to the neighboring cell includes:

determining, according to a PLMN identifier id included in the CGI of the neighboring cell and a correspondence between the PLMN id in the CGI and a PLMN information set, the PLMN information set corresponding to the neighboring cell.

With reference to the first aspect, the first possible implementation manner of the first aspect, the second possible implementation manner of the first aspect, and the third possible implementation manner of the first aspect, in a sixth possible implementation manner of the first aspect, the obtaining, according to the CGI of the neighboring cell and a correspondence between all or part of information in the CGI and a PLMN information set, a PLMN information set corresponding to the neighboring cell includes:

determining, according to a base station id and a cell id that are included in the CGI of the neighboring cell and a correspondence between the base station id and the cell id in the CGI and a PLMN information set, the PLMN information set corresponding to the neighboring cell.

With reference to the first aspect, the first possible implementation manner of the first aspect, the second possible implementation manner of the first aspect, and the third possible implementation manner of the first aspect, in a seventh possible implementation manner of the first aspect, the obtaining, according to the CGI of the neighboring cell and a correspondence between all or part of information in the CGI and a PLMN information set, a PLMN information set corresponding to the neighboring cell includes:

obtaining, according to a PLMN id included in the CGI of the neighboring cell and a correspondence between the PLMN id and a first correspondence, where the first correspondence is a correspondence between a base station id, a cell id and a PLMN information set, a first correspondence corresponding to the PLMN id included in the CGI of the neighboring cell; and determining, according to a base station id and a cell id that are included in the CGI of the neighboring cell and the first correspondence corresponding to the PLMN id included in the CGI of the neighboring cell, the PLMN information set corresponding to the neighboring cell.

With reference to the first aspect, the first possible implementation manner of the first aspect, the second possible implementation manner of the first aspect, and the third possible implementation manner of the first aspect, in an eighth possible implementation manner of the first aspect, the PLMN information set includes: a PLMN id set; or includes:

a set of a PLMN id and an operator state.

In a second aspect, a method for obtaining information of a neighboring cell is provided, where the method includes:

sending, to an operator support system OSS, a CGI obtained by a user equipment for a neighboring cell, so that the OSS obtains, according to the CGI obtained for the neighboring cell by the user equipment and a correspondence between all or part of information in the CGI and a PLMN information set, a PLMN information set corresponding to the neighboring cell; and receiving the PLMN information set corresponding to the neighboring cell sent by the OSS.

In a third aspect, an apparatus for obtaining information of a neighboring cell is provided and includes:

a first obtaining unit, configured to obtain a Cell Global Identifier CGI of a neighboring cell of a base station; and a second obtaining unit, configured to obtain, according to the CGI of the neighboring cell and a correspondence between all or part of information in the CGI and a public land mobile network PLMN information set, a PLMN information set corresponding to the neighboring cell.

With reference to the third aspect, in a first possible implementation manner of the third aspect, the apparatus for obtaining information of a neighboring cell is an OSS, and the first obtaining unit includes:

a first receiving sub-unit, configured to receive identifier information of the neighboring cell sent by the base station, where a CGI included in the identifier information of the neighboring cell is obtained for the neighboring cell and sent to the base station by a user equipment; and a first determining sub-unit, configured to determine the CGI included in the identifier information of the neighboring cell as the CGI of the neighboring cell; and the apparatus for obtaining information of a neighboring cell further includes:

a first sending unit, configured to send the PLMN information set corresponding to the neighboring cell to the base station.

With reference to the third aspect, in a second possible implementation manner of the third aspect, the apparatus for obtaining information of a neighboring cell is an OSS, and the first obtaining unit includes:

a second receiving sub-unit, configured to receive identifier information of the neighboring cell sent by the base station, where a CGI and a PCI that are included in the identifier information of the neighboring cell are obtained by a user equipment for the neighboring cell and are sent to the base station;

a second determining sub-unit, configured to, when a first CGI is found according to the CGI and the PCI that are included in the identifier information of the neighboring cell and cell information, determine whether the first CGI is the same as the CGI included in the identifier information of the neighboring cell, where the first CGI and the CGI included in the identifier information of the neighboring cell have the same base station id and cell id, and a PCI corresponding to the first CGI is the same as the PCI included in the identifier information of the neighboring cell; and a third determining sub-unit, configured to, when the first CGI is different from the CGI included in the identifier information of the neighboring cell, determine the first CGI as the CGI of the neighboring cell; and when the first CGI is the same as the CGI included in the identifier information of the neighboring cell, determine the CGI included in the identifier information of the neighboring cell as the CGI of the neighboring cell; and the apparatus further includes:

a second sending unit, configured to send the PLMN information set corresponding to the neighboring cell to the base station, and send information used for indicating the CGI of the neighboring cell.

With reference to the third aspect, in a third possible implementation manner of the third aspect, the apparatus for obtaining information of a neighboring cell is a base station, and the first obtaining unit includes:

a third receiving sub-unit, configured to receive a CGI that is obtained through measurement performed by a user equipment on the neighboring cell and is sent; and a fourth determining sub-unit, configured to determine the CGI obtained for the neighboring cell by the user equipment as the CGI of the neighboring cell.

With reference to the third aspect, the first possible implementation manner of the third aspect, the second possible implementation manner of the third aspect, and the third possible implementation manner of the third aspect, in a fourth possible implementation manner of the third aspect, the second obtaining unit is specifically configured to:

determine, according to the CGI of the neighboring cell and a correspondence between the CGI and a PLMN information set, the PLMN information set corresponding to the neighboring cell.

With reference to the third aspect, the first possible implementation manner of the third aspect, the second possible implementation manner of the third aspect, and the third possible implementation manner of the third aspect, in a fifth possible implementation manner of the third aspect, the second obtaining unit is specifically configured to:

determine, according to a PLMN id included in the CGI of the neighboring cell and a correspondence between the PLMN id in the CGI and a PLMN information set, the PLMN information set corresponding to the neighboring cell.

With reference to the third aspect, the first possible implementation manner of the third aspect, the second possible implementation manner of the third aspect, and the third possible implementation manner of the third aspect, in a sixth possible implementation manner of the third aspect, the second obtaining unit is specifically configured to:

determine, according to a base station id and a cell id that are included in the CGI of the neighboring cell and a correspondence between the base station id and the cell id in a CGI and a PLMN information set, the PLMN information set corresponding to the neighboring cell.

With reference to the third aspect, the first possible implementation manner of the third aspect, the second possible implementation manner of the third aspect, and the third possible implementation manner of the third aspect, in a seventh possible implementation manner of the third aspect, the second obtaining unit is specifically configured to:

obtain, according to a PLMN id included in the CGI of the neighboring cell and a correspondence between the PLMN id and a first correspondence, where the first correspondence is a correspondence between a base station id, a cell id and a PLMN information set, a first correspondence corresponding to the PLMN id included in the CGI of the neighboring cell; and determine, according to a base station id and a cell id that are included in the CGI of the neighboring cell and the first correspondence corresponding to the PLMN id included in the CGI of the neighboring cell, the PLMN information set corresponding to the neighboring cell.

In a fourth aspect, a base station is provided and includes:

a sending unit, configured to send, to an operator support system OSS, a CGI obtained by a user equipment for a neighboring cell, so that the OSS obtains, according to the CGI obtained for the neighboring cell by the user equipment and a correspondence between all or part of information in the CGI and a PLMN information set, a PLMN information set corresponding to the neighboring cell; and a receiving unit, configured to receive the PLMN information set corresponding to the neighboring cell sent by the OSS.

Based on the foregoing technical solutions, namely, the method and the apparatus for obtaining information of a neighboring cell according to the embodiments of the present invention, with the method for obtaining information of a neighboring cell according to the embodiment of the present invention, through the CGI of the neighboring cell of the base station and the correspondence between all or part of information in the CGI and a PLMN information set, the PLMN information set corresponding to the neighboring cell of the base station is obtained, so that the base station can implement an ANR function well.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention are applicable to various communications systems, such as a Global System for Mobile communications ("GSM") system, a Code Division Multiple Access ("CDMA") system, a Wideband Code Division Multiple Access ("WCDMA") system, a General Packet Radio Service ("GPRS"), a Long Term Evolution ("LTE") system, an LTE Frequency Division Duplex ("FDD") system, an LTE Time Division Duplex ("TDD"), and a Universal Mobile Telecommunications System ("UMTS").

A user equipment (User Equipment, "UE") and a mobile terminal may also be referred to as a user and a mobile user equipment, and can communicate with one or more core networks via a radio access network (such as, Radio Access Network, "RAN"); and a user may be a mobile terminal, such as a mobile phone (or referred to as a "cellular" phone) and a computer that has a mobile terminal, which may be, for example, a portable apparatus, a pocket-sized apparatus, a hand-held apparatus, a mobile apparatus built in a computer, or a vehicle-mounted mobile apparatus, and they exchange language and/or data with the radio access network.

A base station may be a base station (Base Transceiver Station, "BTS") in a Global System for Mobile communications ("GSM") or CDMA, or may be a base station (NodeB) in WCDMA, or may be an evolved base station ("eNB or e-NodeB") in LTE.

Figure 1:
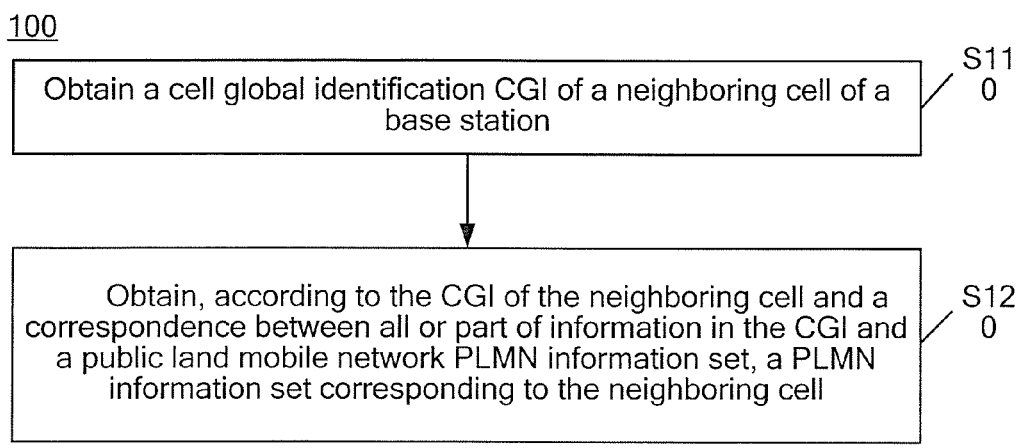
FIG. 1 is a schematic flow chart of a method for obtaining information of a neighboring cell according to an embodiment of the present invention.

FIG. 1 is a schematic flow chart of a method 100 for obtaining information of a neighboring cell according to an embodiment of the present invention. As shown in FIG. 1, the method 100 includes the following steps.

S110: Obtain a CGI of a neighboring cell of a base station.

S120: Obtain, according to the CGI of the neighboring cell and a correspondence between all or part of information in the CGI and a PLMN information set, a PLMN information set corresponding to the neighboring cell.

In the embodiment of the present invention, the PLMN information set may include a PLMN id set, or may include a set of a PLMN id and an operator state, where the set of a PLMN id and an operator state may include a PLMN id and an operator state corresponding to each PLMN id (for example, whether access is allowed). In the embodiment of the present invention, the PLMN information set corresponding to the neighboring cell is a set of information about an operator which the neighboring cell can serve. In the embodiment of the present invention, the PLMN information set may exist in a list form, or may exist in another form, which is not limited in the embodiment of the present invention. In the embodiment of the present invention, PLMN ids included in a PLMN id set may be arranged in a sequence. For example, a PLMN id set including A and B is different from a PLMN id set including B and A.

In the embodiment of the present invention, the forming of a CGI is (PLMN id+base station id+cell id), and therefore, a correspondence between part or all of information in the CGI and a PLMN information set may be a correspondence between (base station id+cell id) and a PLMN information set, may be a correspondence between a PLMN id and a PLMN information set, may be a correspondence between the CGI itself and a PLMN information set, or may be a correspondence between (base station id+cell id) and a PLMN information set of a certain PLMN id.

In the embodiment of the present invention, when the PLMN information set obtained according to the CGI of the neighboring cell and the correspondence between all or part of information in the CGI and a PLMN information set does not include a PLMN id in the CGI of the neighboring cell, the PLMN id in the CGI of the neighboring cell can be added into the PLMN information set obtained according to the correspondence, so as to obtain the PLMN information set corresponding to the neighboring cell.

In the embodiment of the present invention, the correspondence between all or part of information in the CGI and a PLMN information set may be a correspondence directly between all or part of information in the CGI of the neighboring cell and the PLMN information set, namely, the PLMN information set in the correspondence is corresponding to only all or part of information in the CGI of the neighboring cell; or may be correspondence between a range to which all or part of information in the CGI of the neighboring cell belongs and the PLMN information set, namely, the PLMN information set in the correspondence is not only corresponding to all or part of information in the CGI of the neighboring cell, but also corresponding to all or part of information in another CGI.

The method 100 for obtaining information of a neighboring cell in the embodiment of the present invention may be executed by a base station, or may be executed by an OSS, or definitely may be executed by another apparatus, which is not limited in the embodiment of the present invention.

That a base station executes the method 100 for obtaining information of a neighboring cell in the embodiment of the present invention is first used as an example for description in the following.

In the embodiment of the present invention, when the method 100 is executed by the base station, the obtaining a CGI of a neighboring cell of a base station in S110 may include:

receiving a CGI that is obtained by a user equipment for the neighboring cell and is sent; and determining the CGI obtained for the neighboring cell by the user equipment as the CGI of the neighboring cell.

Specifically, after obtaining the CGI for the neighboring cell from a broadcast channel, a user equipment served by the base station may report the obtained CGI to the base station. If the user equipment obtains only the CGI for the neighboring cell, but neither learns the PLMN information set corresponding to the neighboring cell nor reports the PLMN information set to the base station; or the user equipment learns the PLMN information set corresponding to the neighboring cell and reports the PLMN information set to the base station, but the base station needs to verify correctness of the PLMN information set learnt for the neighboring cell by the user equipment, the base station may determine a CGI reported by the user equipment and obtained for the neighboring cell as the CGI of the neighboring cell, and find, according to the CGI of the neighboring cell and a correspondence preconfigured in the base station between part or all of information in a CGI and a PLMN information set, the PLMN information set corresponding to the neighboring cell. For example, according to the range to which all or part of information in the CGI of the neighboring cell belongs, a correspondence between the range and a PLMN information set may be searched to obtain a PLMN information set; and when a PLMN information set obtained according to the correspondence does not include the PLMN id of the neighboring cell, the PLMN id of the neighboring cell may be added into the PLMN information set obtained according to the correspondence, so that the PLMN information set corresponding to the neighboring cell can be obtained.

In the embodiment of the present invention, the correspondence between all or part of information in the CGI in the base station and a PLMN information set may be preconfigured in the base station through an OSS.

In the embodiment of the present invention, the obtaining, according to the CGI of the neighboring cell and a correspondence between all or part of information in the CGI and a PLMN information set, a PLMN information set corresponding to the neighboring cell in S120 may include:

determining, according to the CGI of the neighboring cell and a correspondence between the CGI and a PLMN information set, the PLMN information set corresponding to the neighboring cell.

Specifically, the base station itself is preconfigured with the correspondence between the CGI and a PLMN information set, so that after receiving the CGI of the neighboring cell reported by the user equipment, the base station can find, through the correspondence preconfigured in the base station between a CGI and a PLMN information set, the PLMN information set corresponding to the CGI.

Or, in the embodiment of the present invention, the obtaining, according to the CGI of the neighboring cell and a correspondence between all or part of information in the CGI and a PLMN information set, a PLMN information set corresponding to the neighboring cell in S120 may include:

determining, according to a PLMN id included in the CGI of the neighboring cell and a correspondence between the PLMN id in the CGI and a PLMN information set, the PLMN information set corresponding to the neighboring cell.

Specifically, the base station itself is preconfigured with the correspondence between a PLMN id and a PLMN information set, so that after obtaining the CGI of the neighboring cell, the base station can find, according to the PLMN id in the CGI of the neighboring cell and according to the correspondence preconfigured in the base station between a PLMN id and a PLMN information set, a PLMN information set corresponding to the PLMN id in the CGI of the neighboring cell; and determine whether the PLMN id information set corresponding to the PLMN id in the CGI of the neighboring cell includes the PLMN id in the CGI of the neighboring cell. If the PLMN id information set corresponding to the PLMN id in the CGI of the neighboring cell includes the PLMN id in the CGI of the neighboring cell, the PLMN information set corresponding to the PLMN id in the CGI of the neighboring cell may be directly determined as the PLMN information set corresponding to the neighboring cell; and if the PLMN id information set corresponding to the PLMN id in the CGI of the neighboring cell does not include the PLMN id in the CGI of the neighboring cell, the PLMN id in the CGI of the neighboring cell may be added into the PLMN id information set corresponding to the PLMN id in the CGI of the neighboring cell, so as to obtain the PLMN information set corresponding to the neighboring cell. For example, cells of operator A all serve the same operator list, and it is configured that identifier A of operator A is corresponding to an operator identifier list. For example, a cell of operator A is configured to a cell shared by operator A, operator B and operator C, and when the base station learns a cell of an operator (such as operator A) through a UE, the base station can learn a service operator list (such as, operator A, operator B and operator C) of the cell through configuration information. For another example, cells of operator A all serve the same operator list, and it is configured that identifier A of operator A is corresponding to an operator identifier list. For example, a cell of operator A is configured to a cell shared by operator B and operator C, and when the base station learns a cell of operator A through a UE, the base station can obtain operator list BC through configuration information. The obtained operator list does not include operator A itself, and then operator A may be added into operator list BC, so that service operator list A B C of the cell can be obtained.

Or, in the embodiment of the present invention, the obtaining, according to the CGI of the neighboring cell and a correspondence between all or part of information in the CGI and a PLMN information set, a PLMN information set corresponding to the neighboring cell in S120 may include:

determining, according to a base station id and a cell id that are included in the CGI of the neighboring cell and a correspondence between the base station id and the cell id in the CGI and a PLMN information set, the PLMN information set corresponding to the neighboring cell.

Specifically, the base station itself is preconfigured with the correspondence between (base station id+cell id) and a PLMN information set, so that after obtaining the CGI of the neighboring cell, the base station can obtain, according to the base station id and the cell id in the CGI of the neighboring cell, the PLMN information set corresponding to the neighboring cell. For example, configuration information of the base station itself is as follows: when (eNB id+cell id) belongs to [x, x+y], the corresponding PLMN information set is {operator A, operator B}; when (eNB id+cell id) belongs to [x+y, x+y+z], the corresponding PLMN information set is {operator A}; when (eNB id+cell id) belongs to [x+y+z+a, x+y+z+a+b], the corresponding PLMN information set is {operator B, operator A}; and when (eNB id+cell id) belongs to an interval [x+y+z+a+b, x+y+z+a+b+c], the corresponding PLMN information set is {operator B}; therefore, after obtaining the CGI of the neighboring cell, the base station can determine an interval to which (eNB id+cell id) in the CGI of the neighboring cell belongs, and if the interval is [x+y+z+a, x+y+z+a+b] and the PLMN id is B, the PLMN information set corresponding to the neighboring cell is {operator B, operator A}.

Or, in the embodiment of the present invention, the obtaining, according to the CGI of the neighboring cell and a preconfigured correspondence between all or part of information in the CGI and a PLMN information set, a PLMN information set corresponding to the neighboring cell in S120 includes:

obtaining, according to a PLMN id included in the CGI of the neighboring cell and a correspondence between the PLMN id and a first correspondence, where the first correspondence is a correspondence between a base station id, a cell id and a PLMN information set, a first correspondence corresponding to the PLMN id included in the CGI of the neighboring cell; and determining, according to a base station id and a cell id that are included in the CGI of the neighboring cell and the first correspondence corresponding to the PLMN id included in the CGI of the neighboring cell, the PLMN information set corresponding to the neighboring cell.

Specifically, after obtaining the CGI of the neighboring cell, the base station can obtain, for the PLMN id according to a mapping between (base station id+cell id) and a service operator, the PLMN information set corresponding to the neighboring cell.

For example, configuration information of the base station is as follows: when PLMN id=A and (eNB id+cell id) belongs to an interval [x, x+y], the corresponding PLMN information set is {operator A, operator B}; when (eNB id+cell id) belongs to an interval [x+y, x+y+z], the corresponding PLMN information set is {operator A}; when PLMN id=B and (eNB id+cell id) belongs to an interval [a, a+b], the corresponding PLMN information set is {operator B, operator A}; and when (eNB id+cell id) belongs to an interval [a+b, a+b+c], the corresponding PLMN information set is {operator B}; therefore, after obtaining the CGI of the neighboring cell, the base station can find the corresponding PLMN information set according to the PLMN id and (eNB id+cell id) in the CGI, and if PLMN id=A and (eNB id+cell id) belongs to the interval [x+y, x+y+z], the PLMN information set corresponding to the neighboring cell is {operator A}.

The foregoing is described by using that a base station executes the method 100 for obtaining information of a neighboring cell in the embodiment of the present invention as an example, and that an OSS executes the method 100 for obtaining information of a neighboring cell in the embodiment of the present invention is used as an example for description in the following.

In the embodiment of the present invention, when the method 100 is executed by the OSS, the obtaining a CGI of a neighboring cell of a base station in S110 may include:

receiving identifier information of the neighboring cell sent by the base station, and determining a CGI included in the identifier information of the neighboring cell as the CGI of the neighboring cell, where the CGI included in the identifier information of the neighboring cell is obtained for the neighboring cell and sent to the base station by a user equipment.

Correspondingly, the method 100 may further include:

sending the PLMN information set corresponding to the neighboring cell to the base station.

Specifically, after obtaining the CGI for the neighboring cell, a user equipment served by the base station may report the CGI to the base station. If the base station receives only the CGI, but does not receive the PLMN information set corresponding to the neighboring cell; or the base station receives the PLMN information set corresponding to the neighboring cell, but the base station cannot determine correctness of the PLMN information set, the base station may send the CGI obtained for the neighboring cell by the user equipment to the OSS; and after receiving the CGI sent by the base station and obtained for the neighboring cell of the base station by the user equipment, the OSS may directly consider by default that the CGI obtained for the neighboring cell by the user equipment is correct, and then may search the correspondence between part or all of information in the CGI and a PLMN information set to find the PLMN information set corresponding to the neighboring cell of the base station, and send the PLMN information set corresponding to the neighboring cell of the base station to the base station.

It can be known from the foregoing description that, after receiving the CGI sent by the base station and obtained for the neighboring cell of the base station by the user equipment, the OSS may directly consider by default that the CGI obtained for the neighboring cell of the base station by the user equipment is correct, namely, directly determine the CGI obtained for the neighboring cell of the base station by the user equipment as the CGI of the neighboring cell.

However, in some situations, the CGI of the neighboring cell obtained by the user equipment may be incorrect, and then the OSS may correct the CGI obtained for the neighboring cell by the user equipment, so as to determine a correct CGI of the neighboring cell of the base station. To facilitate understanding, detailed description is made in the following.

In the embodiment of the present invention, when the method 100 is executed by the OSS, identifier information of the neighboring cell sent by the base station is received, where a CGI and a Physical Cell Identifier ("PCI") that are included in the identifier information of the neighboring cell are obtained through measurement performed by a user equipment on the neighboring cell and are sent to the base station.

when a first CGI is found according to the CGI and the PCI that are included in the identifier information of the neighboring cell and cell information, it is determined whether the first CGI is the same as the CGI included in the identifier information of the neighboring cell, where the first CGI and the CGI included in the identifier information of the neighboring cell have the same base station id and cell id, and a PCI corresponding to the first CGI is the same as the PCI included in the identifier information of the neighboring cell.

When the first CGI is different from the CGI included in the identifier information of the neighboring cell, the first CGI is determined as the CGI of the neighboring cell.

When the first CGI is the same as the CGI included in the identifier information of the neighboring cell, the CGI included in the identifier information of the neighboring cell is determined as the CGI of the neighboring cell.

The method further includes:

sending the PLMN information set corresponding to the neighboring cell to the base station, and sending information used for indicating the CGI of the neighboring cell.

Figure 2:
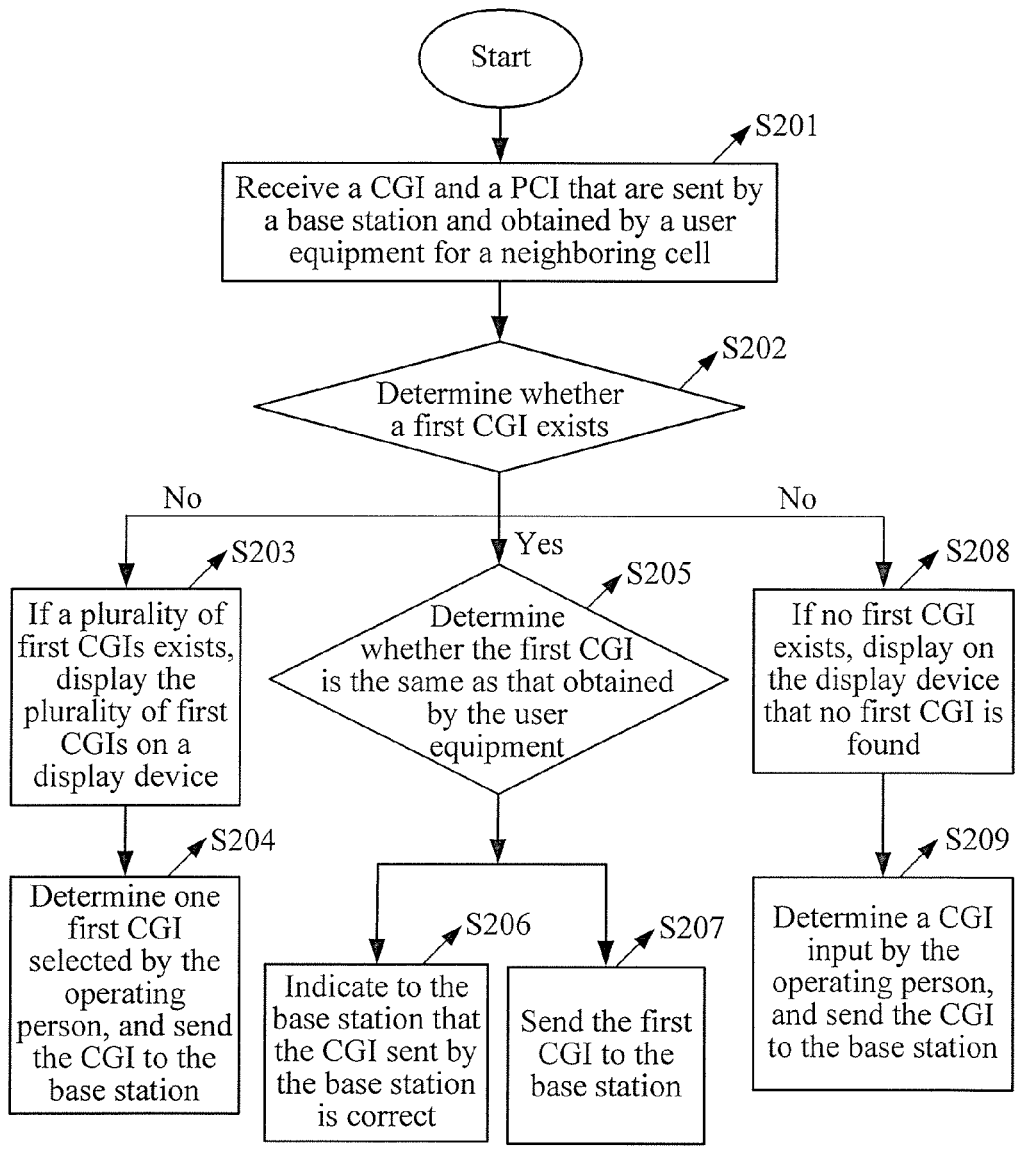
FIG. 2 is a schematic flow chart of a method for obtaining information of a neighboring cell according to another embodiment of the present invention.

In order to clearly understand the foregoing described embodiment, detailed description is made with reference to FIG. 2 in the following.

S201: Receive a CGI and a PCI that are sent by a base station and obtained by a user equipment for a neighboring cell.

Specifically, after obtaining the CGI and the PCI for the neighboring cell, the user equipment may report the PCI and the CGI obtained for the neighboring cell to the base station. If the base station needs to determine whether the CGI reported by the user equipment is correct, the base station may send, to an OSS, the CGI of the neighboring cell and the PCI of the neighboring cell that are reported by the user equipment, so that the OSS receives the CGI and the PCI sent by the base station and obtained for the neighboring cell of the base station by the user equipment.

S202: Determine whether a first CGI exists.

Specifically, after receiving the CGI and the PCI sent by the base station and obtained for the neighboring cell of the base station by the user equipment, the OSS may check, according to (base station id+cell id) in the CGI reported by the base station and obtained for the neighboring cell by the user equipment, whether a CGI having the same (base station id+cell id) as that of the CGI obtained for the neighboring cell by the user equipment exists in cell information preconfigured in the OSS; and if one or more CGIs having the same (base station id+cell id) as that of the CGI obtained for the neighboring cell by the user equipment are found, may compare a PCI corresponding to each of the one or more found CGIs with the PCI of the neighboring cell (namely, the PCI obtained for the neighboring cell by the user equipment) to determine whether a PCI that is the same as the PCI of the neighboring cell exists, namely, determine whether such a CGI (namely, the first CGI) exists, that is, not only the (base station id+cell id) in the CGI is the same as the (base station id+cell id) in the CGI obtained for the neighboring cell by the user equipment, but also the PCI corresponding to the CGI is the same as the PCI of the neighboring cell (namely, the PCI obtained for the neighboring cell by the user equipment). If only one such CGI exists, S205 to S207 are executed; if a plurality of such CGIs exists, S203 and S204 are executed; and if no such CGI exists, S208 and S209 may be executed.

S203 and S204 are subsequent execution steps when a plurality of first CGIs is found.

S203: If a plurality of first CGIs exists, display the plurality of first CGIs on a display device.

Specifically, the OSS may display on a display device that a plurality of first CGIs exists, and an operating person may select a CGI after seeing the plurality of first CGIs on the display device.

S204: Determine one first CGI selected by the operating person, and send the CGI to the base station.

Specifically, the OSS may determine a correct CGI based on the selection of the operating person, and send the correct CGI to the base station.

S205 to S207 are subsequent execution steps when one first CGI is found.

S205: Determine whether the first CGI is the same as that obtained by the user equipment.

Specifically, the OSS compares such a first CGI found from the preconfigured cell information with the CGI obtained for the neighboring cell by the user equipment, and if the first CGI and the CGI obtained for the neighboring cell by the user equipment are the same, S206 is executed, and otherwise S207 is executed.

S206: Indicate to the base station that the CGI sent by the base station is correct.

Specifically, the OSS may determine that the CGI obtained for the neighboring cell by the user equipment is correct, and send, to the base station, information used for indicating that the CGI obtained for the neighboring cell by the user equipment is correct; or definitely, may directly send the CGI to the base station.

S207: Send the first CGI to the base station.

The OSS may determine the first CGI obtained from the preconfigured cell information as a correct CGI of the neighboring cell, and send the correct CGI to the base station.

S208 and S209 are subsequent execution steps when the OSS does not find a first CGI.

S208: If no first CGI exists, display on the display device that no first CGI is found.

Specifically, the OSS may display on the display device that no correct CGI of the neighboring cell is found, so that the operating person performs a corresponding operation, for example, manually determines whether the CGI of the neighboring cell is correct, and may input a correct CGI if it is determined that the CGI of the neighboring cell is incorrect.

S209: Determine a CGI input by the operating person, and send the CGI to the base station.

Specifically, the OSS may determine a correct CGI based on the input of the operating person, and send the correct CGI to the base station.

It should be understood that, the foregoing described manner for obtaining a correct CGI of the neighboring cell of the base station is only a specific implementation manner of the embodiment of the present invention, and the embodiment of the present invention may also have another implementation manner. For example, after receiving the CGI and the PCI of the neighboring cell of the base station, the OSS may query a CGI corresponding to the PCI obtained for the neighboring cell of the base station by the user equipment from cell information preconfigured in the OSS, and then determine whether such a CGI exists among one or more CGIs found through query, where the CGI has the same (base station id and cell id) as that of the CGI obtained for the neighboring cell of the base station by the user equipment; and if one such CGI exists, determine whether a PLMN id of the CGI is consistent with the PLMN id in the CGI obtained for the neighboring cell of the base station by the user equipment, if the PLMN id of the CGI is consistent with the PLMN id in the CGI obtained for the neighboring cell of the base station by the user equipment, determine that the CGI obtained for the neighboring cell of the base station by the user equipment is correct, and if the PLMN id of the CGI is not consistent with the PLMN id in the CGI obtained for the neighboring cell of the base station by the user equipment, determine the CGI as a correct CGI of the neighboring cell of the base station.

In the embodiment of the present invention, the obtaining, according to the CGI of the neighboring cell and a correspondence between all or part of information in the CGI and a PLMN information set, a PLMN information set corresponding to the neighboring cell in S120 may include:

determining, according to the CGI of the neighboring cell and a correspondence between the CGI and a PLMN information set, the PLMN information set corresponding to the neighboring cell.

Specifically, after determining the CGI of the neighboring cell (namely, a correct CGI of the neighboring cell), the OSS may find, by searching the correspondence between the CGI and a PLMN information set, a PLMN information set corresponding to the CGI of the neighboring cell of the base station, and send the PLMN information set corresponding to the CGI of the neighboring cell of the base station and the correct CGI of the neighboring cell of the base station to the base station.

Or, in the embodiment of the present invention, the obtaining, according to the CGI of the neighboring cell and a correspondence between all or part of information in the CGI and a PLMN information set, a PLMN information set corresponding to the neighboring cell in S120 may include:

determining, according to a PLMN id included in the CGI of the neighboring cell and a correspondence between the PLMN id in the CGI and a PLMN information set, the PLMN information set corresponding to the neighboring cell.

Specifically, after obtaining the CGI of the neighboring cell, the OSS may obtain, according to the PLMN id in the CGI of the neighboring cell and by searching the correspondence between the PLMN id and a PLMN information set, a PLMN information set corresponding to the PLMN id in the CGI of the neighboring cell; and determine whether the PLMN id information set corresponding to the PLMN id in the CGI of the neighboring cell includes the PLMN id in the CGI of the neighboring cell. If the PLMN id information set corresponding to the PLMN id in the CGI of the neighboring cell includes the PLMN id in the CGI of the neighboring cell, the PLMN information set corresponding to the PLMN id in the CGI of the neighboring cell may be directly determined as the PLMN information set corresponding to the neighboring cell; and if the PLMN id information set corresponding to the PLMN id in the CGI of the neighboring cell does not include the PLMN id in the CGI of the neighboring cell, the PLMN id in the CGI of the neighboring cell may be added into the PLMN id information set corresponding to the PLMN id in the CGI of the neighboring cell, so as to obtain the PLMN information set corresponding to the neighboring cell. For example, cells of operator A all serve the same operator list, and it is configured that identifier A of operator A is corresponding to an operator identifier list. For example, a cell of operator A is configured to a cell shared by operator A, operator B and operator C, and after receiving the CGI of the neighboring cell of the base station sent by the base station, the OSS can learn, according to the PLMN id in the CGI of the neighboring cell of the base station, a service operator list (such as, operator A, operator B and operator C) corresponding to the neighboring cell of the base station. For another example, cells of operator A all serve the same operator list, and it is configured that identifier A of operator A is corresponding to an operator identifier list. For example, a cell of operator A is configured to a cell shared by operator B and operator C, and when the base station learns a cell of operator A through a UE, the base station can obtain operator list BC through configuration information. The obtained operator list does not include operator A itself, and then operator A may be added into operator list BC, so that service operator list A B C of the cell can be obtained.

Or, in the embodiment of the present invention, the obtaining, according to the CGI of the neighboring cell and a correspondence between all or part of information in the CGI and a PLMN information set, a PLMN information set corresponding to the neighboring cell in S120 may include:

determining, according to (base station id+cell id) that are included in the CGI of the neighboring cell and a correspondence between the (base station id+cell id) in the CGI and a PLMN information set, the PLMN information set corresponding to the neighboring cell.

Specifically, after obtaining the CGI of the neighboring cell of the base station, the OSS may obtain, according to the (base station id+cell id) in the CGI of the neighboring cell of the base station, the PLMN information set corresponding to the neighboring cell of the base station. For example, configuration information of the OSS itself is as follows: when (eNB id+cell id) belongs to [x, x+y], the corresponding PLMN information set is {operator A, operator B}; when (eNB id+cell id) belongs to [x+y, x+y+z], the corresponding PLMN information set is {operator A}; when (eNB id+cell id) belongs to [x+y+z+a, x+y+z+a+b], the corresponding PLMN information set is {operator B, operator A}; and when (eNB id+cell id) belongs to an interval [x+y+z+a+b, x+y+z+a+b+c], the corresponding PLMN information set is {operator B}; therefore, after obtaining the CGI of the neighboring cell, the OSS can determine an interval to which (eNB id+cell id) in the CGI of the neighboring cell of the base station belongs, and if the interval to which the (eNB id+cell id) included in the CGI of the neighboring cell belongs is [x+y+z+a, x+y+z+a+b] and the included PLMN id is B, the PLMN information set corresponding to the neighboring cell is {operator B, operator A}.

Or, in the embodiment of the present invention, the obtaining, according to the CGI of the neighboring cell and a correspondence between all or part of information in the CGI and a PLMN information set, a PLMN information set corresponding to the neighboring cell in S120 includes:

obtaining, according to a PLMN id included in the CGI of the neighboring cell and a correspondence between the PLMN id and a first correspondence, where the first correspondence is a correspondence between a base station id, a cell id and a PLMN information set, a first correspondence corresponding to the PLMN id included in the CGI of the neighboring cell; and determining, according to (a base station id and a cell id) that are included in the CGI of the neighboring cell and the first correspondence corresponding to the PLMN id included in the CGI of the neighboring cell, the PLMN information set corresponding to the neighboring cell.

For example, configuration information in the OSS is as follows: when PLMN id=A and (eNB id+cell id) belongs to an interval [x, x+y], the corresponding PLMN information set is {operator A, operator B}; when (eNB id+cell id) belongs to an interval [x+y, x+y+z], the corresponding PLMN information set is {operator A}; when PLMN id=B and (eNB id+cell id) belongs to an interval [a, a+b], the corresponding PLMN information set is {operator B, operator A}; and when (eNB id+cell id) belongs to an interval [a+b, a+b+c], the corresponding PLMN information set is {operator B}; therefore, after receiving the CGI of the neighboring cell of the base station sent by the base station, the OSS can find the corresponding PLMN information set according to the PLMN id and (eNB id+cell id) in the CGI, and if PLMN id=A and (eNB id+cell id) belongs to the interval [x+y, x+y+z], the PLMN information set corresponding to the neighboring cell is {operator A}.

Therefore, with the method for obtaining information of a neighboring cell according to the embodiment of the present invention, through the CGI of the neighboring cell of the base station and the correspondence between all or part of information in the CGI and a PLMN information set, the PLMN information set corresponding to the neighboring cell of the base station is obtained, so that the base station can implement an ANR function well.

When the method 100 for obtaining information of a neighboring cell in the embodiment of the present invention is executed by an OSS, the embodiment of the present invention may further include a method 200 for obtaining information of a neighboring cell executed by a base station.

Figure 3:
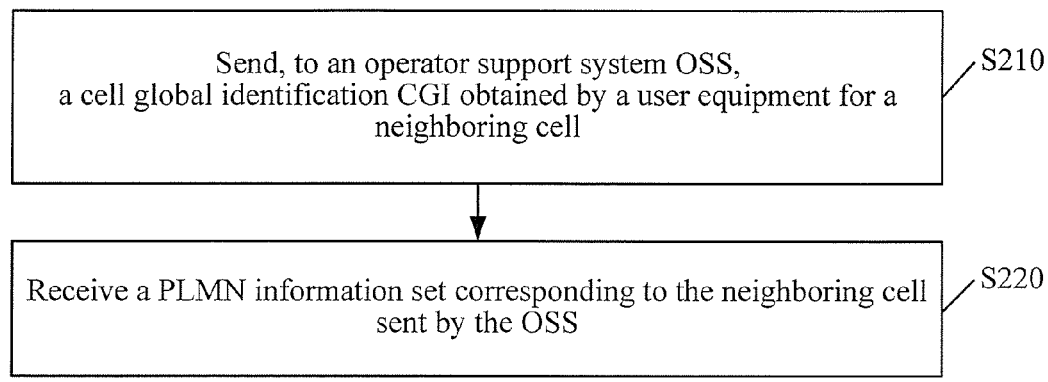
FIG. 3 is a schematic flow chart of a method for obtaining information of a neighboring cell according to another embodiment of the present invention.

FIG. 3 is a schematic flowchart of a method 200 for obtaining information of a neighboring cell according to an embodiment of the present invention. The method 200 may be executed by a base station. As shown in FIG. 3, the method 200 includes the following steps.

S210: Send, to an OSS, a CGI obtained by a user equipment for a neighboring cell, so that the OSS obtains, according to the CGI obtained for the neighboring cell by the user equipment and a correspondence between all or part of information in the CGI and a PLMN information set, a PLMN information set corresponding to the neighboring cell.

S220: Receive the PLMN information set corresponding to the neighboring cell sent by the OSS.

Specifically, after obtaining the CGI for the neighboring cell, a user equipment served by the base station may report the CGI to the base station. If the base station receives only the CGI obtained for the neighboring cell by the user equipment, but does not receive the PLMN information set corresponding to the neighboring cell; or the base station receives the PLMN information set corresponding to the neighboring cell, but the base station cannot determine correctness of the PLMN information set, the base station may send the CGI obtained for the neighboring cell by the user equipment to the OSS; and after receiving the CGI sent by the base station and obtained for the neighboring cell of the base station by the user equipment, the OSS may directly determine the CGI obtained for the neighboring cell by the user equipment as a CGI of the neighboring cell, or may correct the CGI obtained by the user equipment, so as to obtain a CGI of the neighboring cell, namely, a correct CGI of the neighboring cell, and then the base station may find, by searching the correspondence between part or all of information in the CGI and a PLMN information set, the PLMN information set corresponding to the neighboring cell of the base station, and send the PLMN information set corresponding to the neighboring cell of the base station to the base station.

Therefore, with the method for obtaining information of a neighboring cell according to the embodiment of the present invention, the CGI obtained for the neighboring cell by the user equipment is sent to the OSS, so that the OSS obtains, according to the CGI obtained for the neighboring cell by the user equipment and the correspondence between all or part of information in the CGI and a PLMN information set, the PLMN information set corresponding to the neighboring cell, and sends the PLMN information set to the base station, and therefore the base station can implement an ANR function well.

Figure 4:
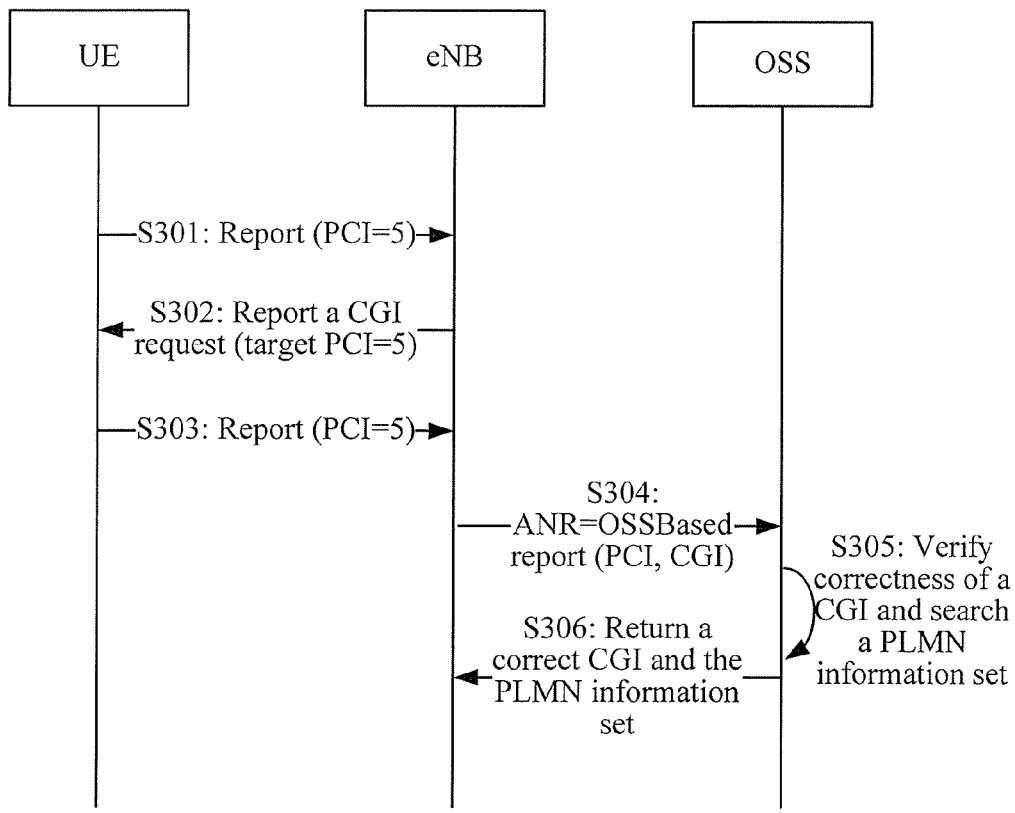
FIG. 4 is a schematic flow chart of a method for obtaining information of a neighboring cell according to another embodiment of the present invention.

FIG. 4 is a schematic flow chart of a method 300 for obtaining information of a neighboring cell according to an embodiment of the present invention. As shown in FIG. 4, the method 300 includes the following steps.

S301: A UE detects that a signal of a cell 1 with PCI=5 is strong, and then reports the detected PCI=5 to an eNB.

S302: The eNB finds, through query, that the eNB has no information about the cell 1 with PCI=5, and then delivers a command to request the UE to measure a CGI of the cell 1 with PCI=5.

S303: The UE initiates measurement, obtains CGI=19 of the cell 1 with PCI=5 from a broadcast channel, and reports the detected CGI=19 to the eNB.

S304: The eNB sends a request to an OSS to request the OSS to obtain information that is used by the eNB itself to implement an ANR function, where the request carries (PCI, CGI) obtained by a user equipment for the cell 1.

S305: After receiving the (PCI, CGI) obtained by the user equipment for the cell 1 and sent by the base station, the OSS determines, according to the (PCI, CGI) obtained by the user equipment for the cell 1 and preconfigured cell information, correctness of the CGI obtained by the user equipment for the cell 1, and obtains a correct CGI if the CGI reported by the eNB is not correct; and after determining a correct CGI of the cell 1, obtains, according to the correct CGI of the cell 1 and a preconfigured correspondence between all or part of information in the CGI and a PLMN information set, a PLMN information set corresponding to the cell 1, where the PLMN information set may include a PLMN id set, or include a set of a PLMN id and an operator state, where the set of a PLMN id and an operator state may include a PLMN id and an operator state corresponding to each PLMN id (for example, whether access is allowed).

For a specific implementation method, reference may be made the foregoing description, which is not described herein again for a purpose of conciseness.

S306: Send the found correct CGI of the cell 1 and the PLMN information set corresponding to the cell 1 to the eNB, so that the base station implements the ANR function.

Therefore, with the method for obtaining information of a neighboring cell according to the embodiment of the present invention, the base station sends (PCI, CGI) of the neighboring cell to the OSS; and the OSS determines the correct CGI of the neighboring cell of the base station according to (PCI, CGI) and the preconfigured cell information, obtains, according to the correct CGI and the correspondence between all or part of information in the CGI and a PLMN information set, the PLMN information set corresponding to the neighboring cell of the base station, and then sends the obtained correct CGI of the neighboring cell of the base station and the PLMN information set corresponding to the neighboring cell of the base station to the base station, so that the base station can implement an ANR function well.

The method for obtaining information of a neighboring cell according to the embodiment of the present invention is described with reference to FIG. 1 to FIG. 4 in the foregoing, and an apparatus for obtaining information of a neighboring cell according to an embodiment of the present invention is described with reference to FIG. 5 to FIG. 13 in the following.

Figure 5:
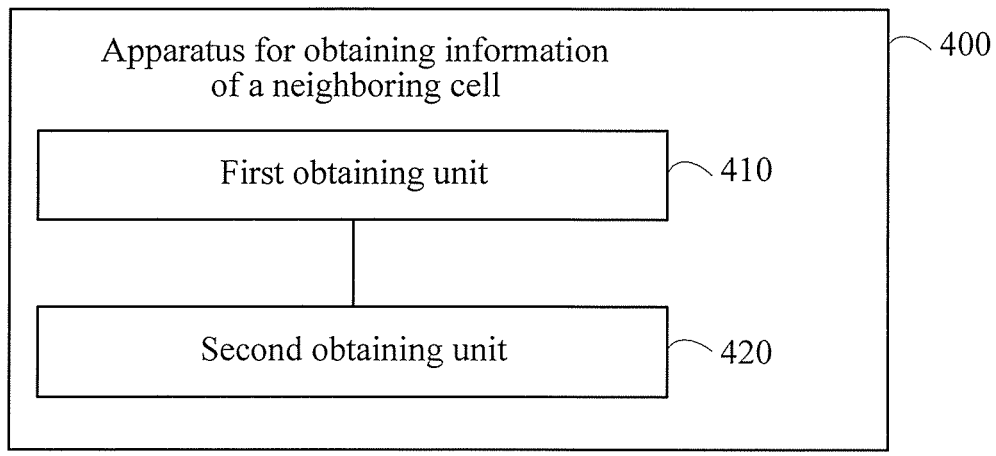
FIG. 5 is a schematic block diagram of an apparatus for obtaining information of a neighboring cell according to an embodiment of the present invention.

FIG. 5 is a schematic block diagram of an apparatus 400 for obtaining information of a neighboring cell according to an embodiment of the present invention. As shown in FIG. 5, the apparatus 400 includes:

a first obtaining unit 410, configured to obtain a Cell Global Identifier CGI of a neighboring cell of a base station; and a second obtaining unit 420, configured to obtain, according to the CGI of the neighboring cell and a correspondence between all or part of information in the CGI and a public land mobile network PLMN information set, a PLMN information set corresponding to the neighboring cell.

Figure 6:
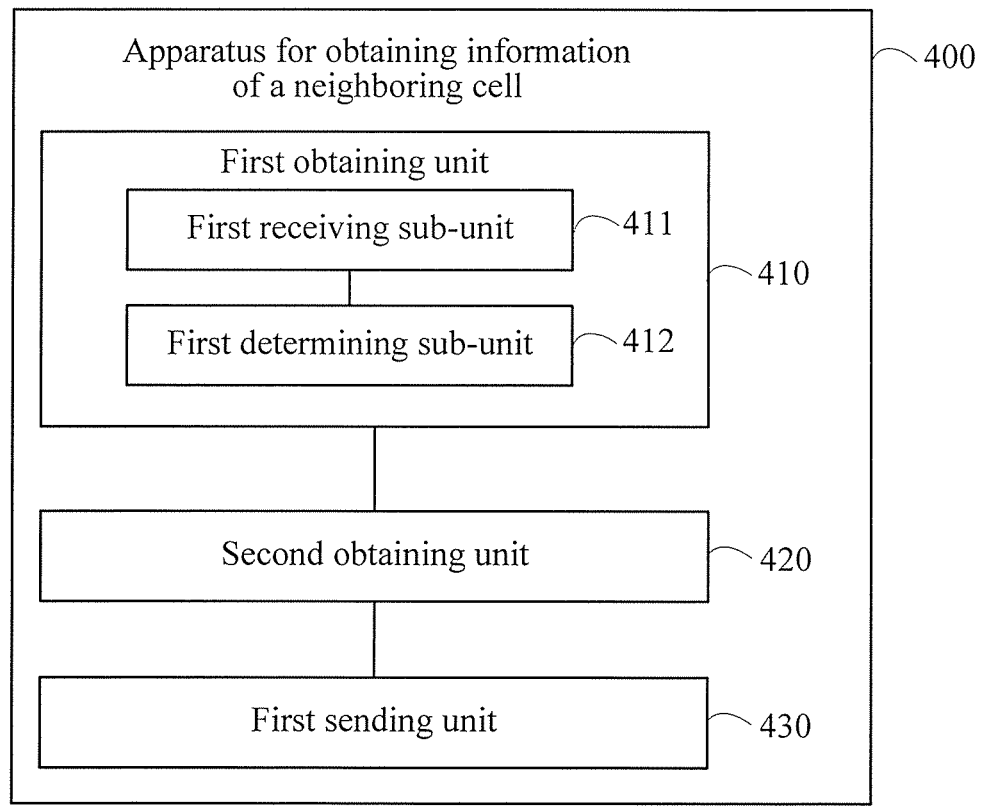
FIG. 6 is a schematic block diagram of an apparatus for obtaining information of a neighboring cell according to another embodiment of the present invention.

Optionally, as shown in FIG. 6, the apparatus 400 for obtaining information of a neighboring cell is an OSS, and the first obtaining unit 410 includes:

a first receiving sub-unit 411, configured to receive identifier information of the neighboring cell sent by the base station, where a CGI included in the identifier information of the neighboring cell is obtained for the neighboring cell and sent to the base station by a user equipment; and a first determining sub-unit 412, configured to determine the CGI included in the identifier information of the neighboring cell as the CGI of the neighboring cell.

The apparatus 400 for obtaining information of a neighboring cell further includes:

a first sending unit 430, configured to send the PLMN information set corresponding to the neighboring cell to the base station.

Figure 7:
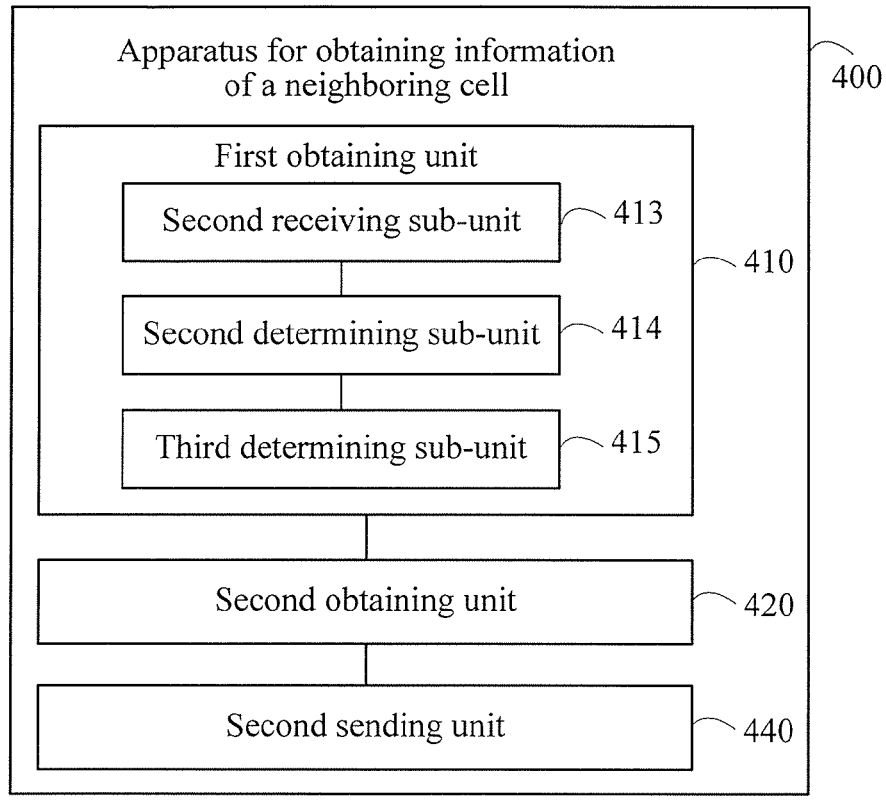
FIG. 7 is a schematic block diagram of an apparatus for obtaining information of a neighboring cell according to another embodiment of the present invention.

Optionally, as shown in FIG. 7, the apparatus 400 is an OSS, and the first obtaining unit 410 includes:

a second receiving sub-unit 413, configured to receive identifier information of the neighboring cell sent by the base station, where a CGI and a PCI that are included in the identifier information of the neighboring cell are obtained by a user equipment for the neighboring cell and are sent to the base station;

a second determining sub-unit 414, configured to, when a first CGI is found according to the CGI and the PCI that are included in the identifier information of the neighboring cell and cell information, determine whether the first CGI is the same as the CGI included in the identifier information of the neighboring cell, where the first CGI and the CGI included in the identifier information of the neighboring cell have the same base station id and cell id, and a PCI corresponding to the first CGI is the same as the PCI included in the identifier information of the neighboring cell; and a third determining sub-unit 415, configured to, when the first CGI is different from the CGI included in the identifier information of the neighboring cell, determine the first CGI as the CGI of the neighboring cell; and when the first CGI is the same as the CGI included in the identifier information of the neighboring cell, determine the CGI included in the identifier information of the neighboring cell as the CGI of the neighboring cell.

The apparatus 400 further includes:

a second sending unit 440, configured to send the PLMN information set corresponding to the neighboring cell to the base station, and send information used for indicating the CGI of the neighboring cell.

Figure 8:
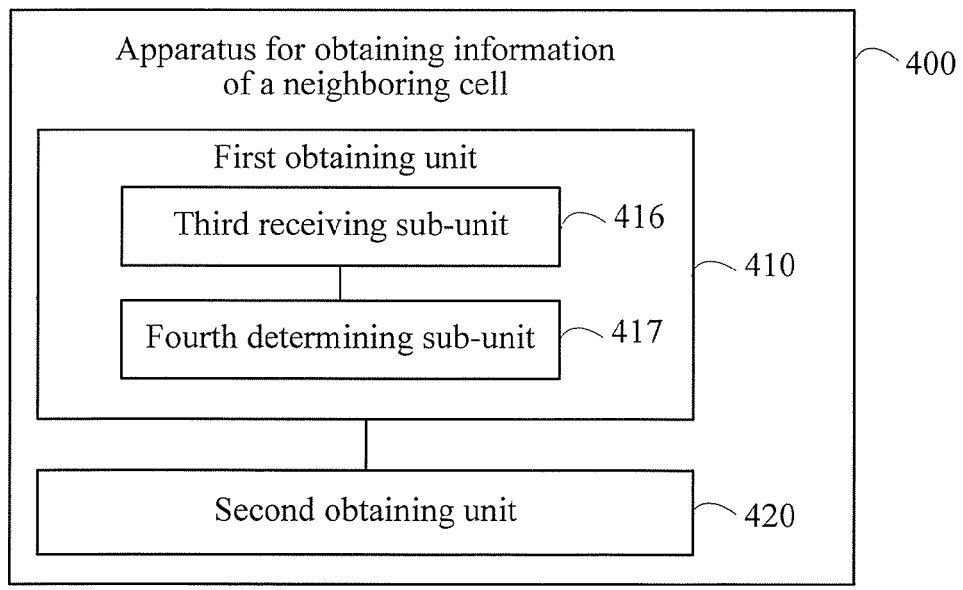
FIG. 8 is a schematic block diagram of abase station according to an embodiment of the present invention.

Optionally, as shown in FIG. 8, the apparatus 400 is a base station, and the first obtaining unit 410 includes:

a third receiving sub-unit 416, configured to receive a CGI that is obtained through measurement performed by a user equipment on the neighboring cell and is sent; and a fourth determining sub-unit 417, configured to determine the CGI obtained for the neighboring cell by the user equipment as the CGI of the neighboring cell.

Optionally, the second obtaining unit 420 is specifically configured to:

determine, according to the CGI of the neighboring cell and a correspondence between the CGI and a PLMN information set, the PLMN information set corresponding to the neighboring cell.

Optionally, the second obtaining unit 420 is specifically configured to:

determine, according to a PLMN id included in the CGI of the neighboring cell and a correspondence between the PLMN id in the CGI and a PLMN information set, the PLMN information set corresponding to the neighboring cell.

Optionally, the second obtaining unit 420 is specifically configured to:

determine, according to a base station id and a cell id that are included in the CGI of the neighboring cell and a correspondence between the base station id and the cell id in the CGI and a PLMN information set, the PLMN information set corresponding to the neighboring cell.

Optionally, the second obtaining unit 420 is specifically configured to:

obtain, according to a PLMN id included in the CGI of the neighboring cell and a correspondence between the PLMN id and a first correspondence, where the first correspondence is a correspondence between a base station id, a cell id and a PLMN information set, a first correspondence corresponding to the PLMN id included in the CGI of the neighboring cell; and determine, according to a base station id and a cell id that are included in the CGI of the neighboring cell and the first correspondence corresponding to the PLMN id included in the CGI of the neighboring cell, the PLMN information set corresponding to the neighboring cell.

Therefore, in the embodiment of the present invention, through the CGI of the neighboring cell of the base station and the correspondence between all or part of information in the CGI and a PLMN information set, the PLMN information set corresponding to the neighboring cell of the base station is obtained, so that the base station can implement an ANR function well.

Figure 9:
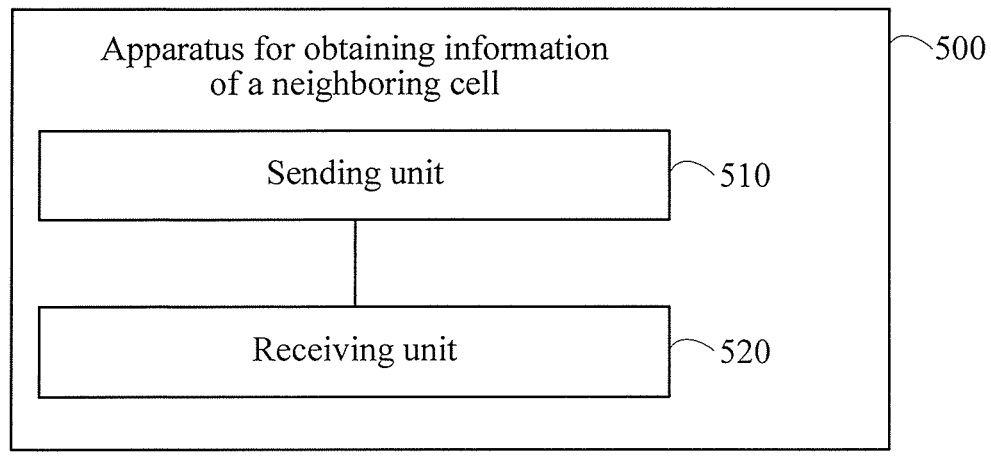
FIG. 9 is a schematic block diagram of an OSS according to an embodiment of the present invention.

FIG. 9 is a schematic block diagram of a base station 500 (an apparatus for obtaining information of a neighboring cell) according to an embodiment of the present invention. As shown in FIG. 9, the base station 500 includes:

a sending unit 510, configured to send, to an operator support system OSS, a CGI obtained by a user equipment for a neighboring cell, so that the OSS obtains, according to the CGI obtained for the neighboring cell by the user equipment and a correspondence between all or part of information in the CGI and a PLMN information set, a PLMN information set corresponding to the neighboring cell; and a receiving unit 520, configured to receive the PLMN information set corresponding to the neighboring cell sent by the OSS.

Therefore, in the embodiment of the present invention, the CGI obtained for the neighboring cell by the user equipment is sent to the OSS, so that the OSS obtains, according to the CGI obtained for the neighboring cell by the user equipment and the correspondence between all or part of information in the CGI and a PLMN information set, the PLMN information set corresponding to the neighboring cell, and sends the PLMN information set to the base station, and therefore the base station can implement an ANR function well.

Figure 10:
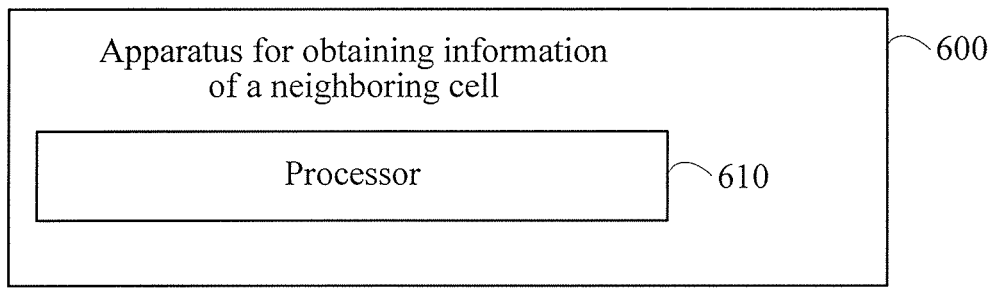
FIG. 10 is a schematic block diagram of an OSS according to another embodiment of the present invention.

FIG. 10 is a schematic block diagram of an apparatus 600 for obtaining information of a neighboring cell according to an embodiment of the present invention. The apparatus 600 includes:

a processor 610, configured to obtain a Cell Global Identifier CGI of a neighboring cell of a base station; and obtain, according to the CGI of the neighboring cell and a correspondence between all or part of information in the CGI and a public land mobile network PLMN information set, a PLMN information set corresponding to the neighboring cell.

Figure 11:
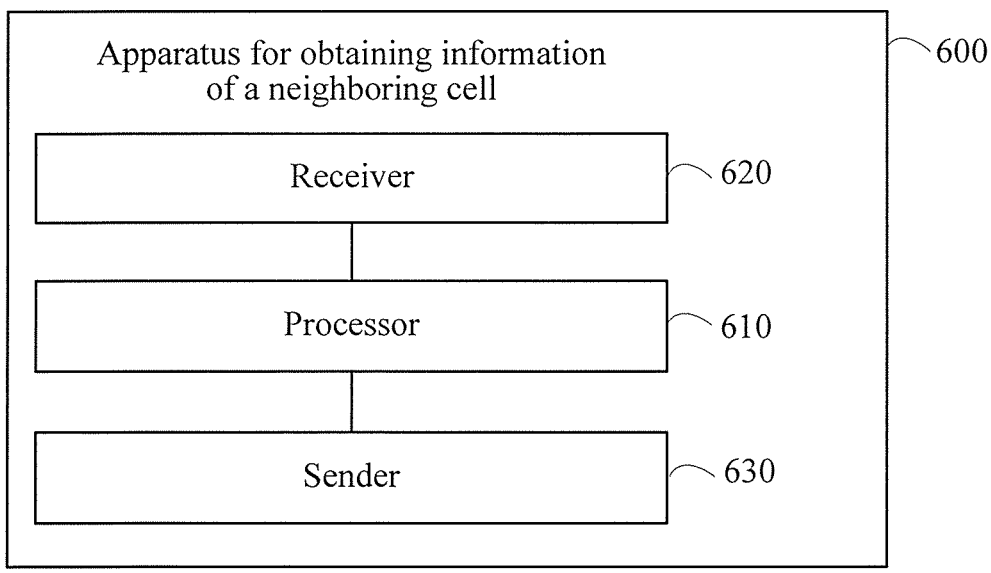
FIG. 11 is a schematic block diagram of a base station according to another embodiment of the present invention.

Optionally, as shown in FIG. 11, when the apparatus 600 is an OSS, the apparatus 600 further includes a receiver 620 and a sender 630.

Optionally, the receiver 620 is configured to receive identifier information of the neighboring cell sent by the base station, where a CGI included in the identifier information of the neighboring cell is obtained for the neighboring cell and sent to the base station by a user equipment;

the processor 610 is specifically configured to determine the CGI included in the identifier information of the neighboring cell as the CGI of the neighboring cell; and the sender 630 is configured to send the PLMN information set corresponding to the neighboring cell to the base station.

Optionally, the receiver 620 is configured to receive identifier information of the neighboring cell sent by the base station, where a CGI and a PCI that are included in the identifier information of the neighboring cell are obtained by a user equipment for the neighboring cell and are sent to the base station;

the processor 610 is specifically configured to, when a first CGI is found according to the CGI and the PCI that are included in the identifier information of the neighboring cell and cell information, determine whether the first CGI is the same as the CGI included in the identifier information of the neighboring cell, where the first CGI and the CGI included in the identifier information of the neighboring cell have the same base station id and cell id, and a PCI corresponding to the first CGI is the same as the PCI included in the identifier information of the neighboring cell; and when the first CGI is different from the CGI included in the identifier information of the neighboring cell, determine the first CGI as the CGI of the neighboring cell; and when the first CGI is the same as the CGI included in the identifier information of the neighboring cell, determine the CGI included in the identifier information of the neighboring cell as the CGI of the neighboring cell; and the sender 630 is configured to send the PLMN information set corresponding to the neighboring cell to the base station, and send information used for indicating the CGI of the neighboring cell.

Figure 12:
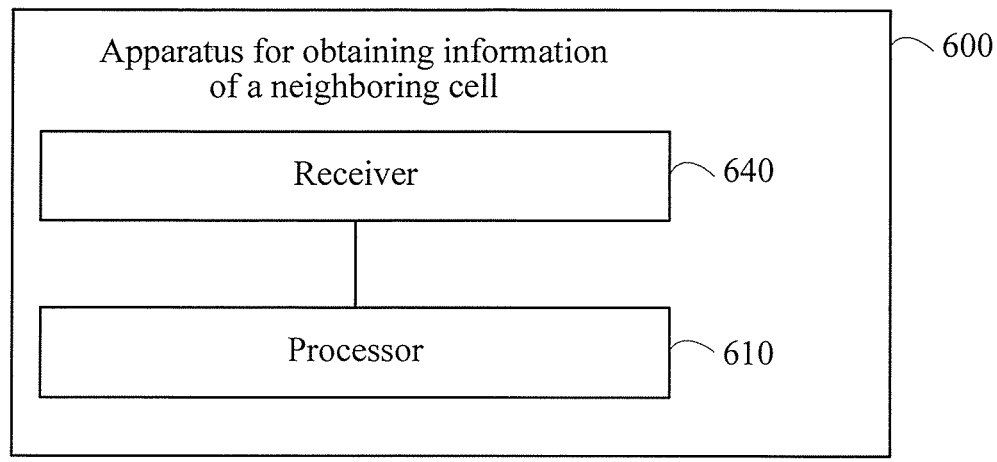
FIG. 12 is a schematic block diagram of an OSS according to another embodiment of the present invention.

Optionally, when the apparatus 600 is abase station, as shown in FIG. 12, the apparatus 600 further includes:

a receiver 640, configured to receive a CGI that is obtained through measurement performed by a user equipment on the neighboring cell and is sent, where a processor 610 is specifically configured to determine the CGI obtained for the neighboring cell by the user equipment as the CGI of the neighboring cell.

Optionally, the processor 610 is specifically configured to:

determine, according to the CGI of the neighboring cell and a correspondence between the CGI and a PLMN information set, the PLMN information set corresponding to the neighboring cell.

Optionally, the processor 610 is specifically configured to:

determine, according to a PLMN id included in the CGI of the neighboring cell and a correspondence between the PLMN id in the CGI and a PLMN information set, the PLMN information set corresponding to the neighboring cell.

Optionally, the processor 610 is specifically configured to:

determine, according to a base station id and a cell id that are included in the CGI of the neighboring cell and a correspondence between the base station id and the cell id in the CGI and a PLMN information set, the PLMN information set corresponding to the neighboring cell.

Optionally, the processor 610 is specifically configured to:

obtain, according to a PLMN id included in the CGI of the neighboring cell and a correspondence between the PLMN id and a first correspondence, where the first correspondence is a correspondence between a base station id, a cell id and a PLMN information set, a first correspondence corresponding to the PLMN id included in the CGI of the neighboring cell; and determine, according to a base station id and a cell id that are included in the CGI of the neighboring cell and the first correspondence corresponding to the PLMN id included in the CGI of the neighboring cell, the PLMN information set corresponding to the neighboring cell.

Therefore, in the embodiment of the present invention, through the CGI of the neighboring cell of the base station and the correspondence between all or part of information in the CGI and a PLMN information set, the PLMN information set corresponding to the neighboring cell of the base station is obtained, so that the base station can implement an ANR function well.

Figure 13:
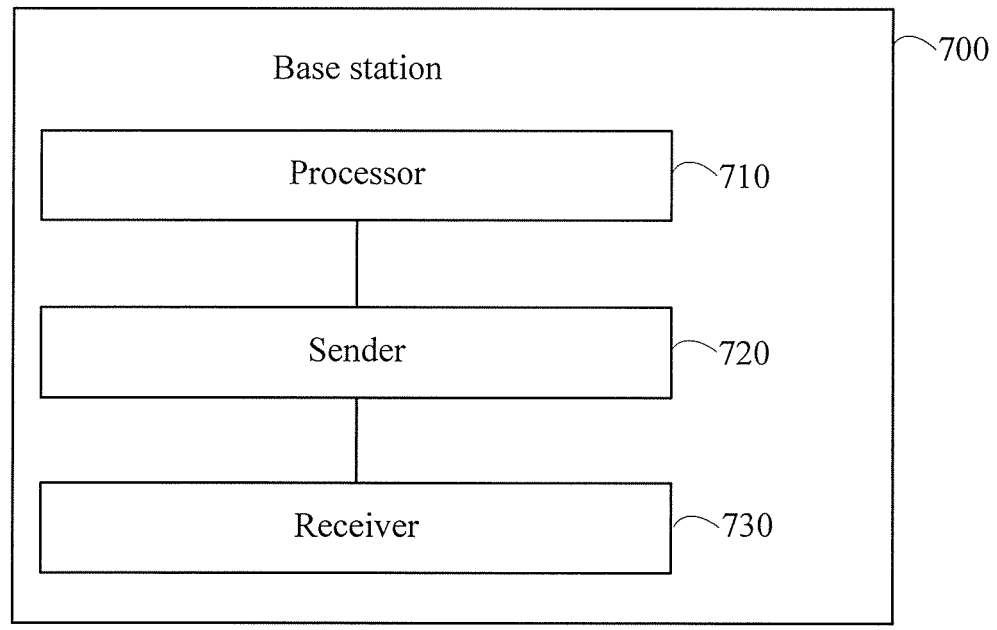
FIG. 13 is a schematic block diagram of a base station according to another embodiment of the present invention.

FIG. 13 is a schematic block diagram of a base station 700 according to an embodiment of the present invention. As shown in FIG. 13, the base station 700 includes:

a processor 710, configured to determine to send, to an OSS, a CGI obtained by a user equipment for a neighboring cell;

a sender 720, configured to send, to the OSS, the CGI obtained for the neighboring cell by the user equipment, so that the OSS obtains, according to the CGI obtained for the neighboring cell by the user equipment and a correspondence between all or part of information in the CGI and a PLMN information set, a PLMN information set corresponding to the neighboring cell; and a receiver 730, configured to receive the PLMN information set corresponding to the neighboring cell sent by the OSS.

Therefore, in the embodiment of the present invention, the CGI obtained for the neighboring cell by the user equipment is sent to the OSS, so that the OSS obtains, according to the CGI obtained for the neighboring cell by the user equipment and the correspondence between all or part of information in the CGI and a PLMN information set, the PLMN information set corresponding to the neighboring cell, and sends the PLMN information set to the base station, and therefore the base station can implement an ANR function well.

A person of ordinary skill in the art may be aware that, with reference to the examples described in the embodiments disclosed in this specification, units and algorithm steps can be implemented by electronic hardware, or a combination of computer software and electronic hardware. Whether these functions are performed in a hardware or software manner depends on particular applications and design constraint conditions of the technical solutions. A person skilled in the art may use a different method to implement the described functions for each particular application, but it should not be considered that such implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In several embodiments provided in the present application, it should be understood that the disclosed system, apparatus, and method may be implemented in other manners. For example, the foregoing described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or a part contributing to the prior art, or a part of the technical solutions may be implemented in the form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement that can be readily figured out by a person skilled in the art within the technical scope disclosed in the present invention shall all fall within the protection scope of the present invention. Therefore, the protection scope of the present invention shall be subject to the protection scope of the claims.

What is claimed is:

1. In an Operator Support System (OSS), a method for obtaining information of a neighboring cell, the method comprising:
    receiving, from a user equipment, a Cell Global Identifier (CGI) of a neighboring cell of a base station, wherein receiving the CGI comprises receiving, from the base station, identifier information of the neighboring cell;
    determining, according to the CGI of the neighboring cell and a correspondence between all or part of information in the CGI and a Public Land Mobile Network (PLMN) information set, the PLMN information set corresponding to the neighboring cell;
    sending the PLMN information set corresponding to the neighboring cell to the base station;
    receiving, from the base station, a CGI and a Physical Cell Identifier (PCI) comprised in the identifier information of the neighboring cell, wherein the CGI and the PCI are sent to the base station by the user equipment;
    when a first CGI is found according to the CGI and the PCI comprised in the identifier information of the neighboring cell and cell information, determining whether the first CGI is the same as the CGI comprised in the identifier information of the neighboring cell, wherein the first CGI and the CGI comprised in the identifier information of the neighboring cell have the same base station id and cell id, and a PCI corresponding to the first CGI is the same as the PCI comprised in the identifier information of the neighboring cell;
    when the first CGI is different from the CGI comprised in the identifier information of the neighboring cell, determining the first CGI as the CGI of the neighboring cell; and
    when the first CGI is the same as the CGI comprised in the identifier information of the neighboring cell, determining the CGI comprised in the identifier information of the neighboring cell as the CGI of the neighboring cell; and
    the method further comprises:
        sending information used for indicating the CGI of the neighboring cell to the base station.

2. The method according to claim 1, further comprising: determining a CGI comprised in the identifier information of the neighboring cell as the CGI of the neighboring cell.

3. The method according to claim 1, wherein determining the PLMN information set corresponding to the neighboring cell comprises:
    determining, according to the CGI of the neighboring cell and a correspondence between the CGI and a PLMN information set, the PLMN information set corresponding to the neighboring cell.

4. The method according to claim 1, wherein determining the PLMN information set corresponding to the neighboring cell comprises:
    determining, according to a PLMN identifier id comprised in the CGI of the neighboring cell and a correspondence between the PLMN id in the CGI and a PLMN information set, the PLMN information set corresponding to the neighboring cell.

5. The method according to claim 1, wherein determining the PLMN information set corresponding to the neighboring cell comprises:
    determining, according to a base station id and a cell id that are comprised in the CGI of the neighboring cell and a correspondence between the base station id and the cell id in the CGI and a PLMN information set, the PLMN information set corresponding to the neighboring cell.

6. The method according to claim 1, wherein determining the PLMN information set corresponding to the neighboring cell comprises:
    obtaining, according to a PLMN id comprised in the CGI of the neighboring cell and a correspondence between the PLMN id and a first correspondence, wherein the first correspondence is a correspondence between a base station id, a cell id and a PLMN information set, a first correspondence corresponding to the PLMN id comprised in the CGI of the neighboring cell; and
    determining, according to a base station id and a cell id that are comprised in the CGI of the neighboring cell and the first correspondence corresponding to the PLMN id comprised in the CGI of the neighboring cell, the PLMN information set corresponding to the neighboring cell.

7. The method according to claim 1, wherein the PLMN information set comprises:
    a PLMN id set; or
    a set of a PLMN id and an operator state.

8. An apparatus for obtaining information of a neighboring cell, comprising:
    a processor; and
    memory coupled to the processor, the memory comprising instructions that, when executed by the processor, cause the apparatus to:
        receive, from a user equipment, a Cell Global Identifier (CGI) of a neighboring cell of a base station, wherein receiving the CGI comprises receiving, from the base station, identifier information of the neighboring cell; and
        determine, according to the CGI of the neighboring cell and a correspondence between all or part of information in the CGI and a Public Land Mobile Network (PLMN) information set, the PLMN information set corresponding to the neighboring cell; and
        send the PLMN information set corresponding to the neighboring cell to the base station;
    wherein a CGI and a Physical Cell Identifier (PCI) comprised in the identifier information of the neighboring cell are sent to the base station by the user equipment, further comprising instructions that, when executed by the processor, cause the apparatus to:
        when a first CGI is found according to the CGI and the PCI that are comprised in the identifier information of the neighboring cell and cell information, determine whether the first CGI is the same as the CGI comprised in the identifier information of the neighboring cell, wherein the first CGI and the CGI comprised in the identifier information of the neighboring cell have the same base station id and cell id, and a PCI corresponding to the first CGI is the same as the PCI comprised in the identifier information of the neighboring cell, and when the first CGI is different from the CGI comprised in the identifier information of the neighboring cell, determine the first CGI as the CGI of the neighboring cell, and when the first CGI is the same as the CGI comprised in the identifier information of the neighboring cell, determine the CGI comprised in the identifier information of the neighboring cell as the CGI of the neighboring cell; and send information used for indicating the CGI of the neighboring cell to the base station.

9. The apparatus according to claim 8, comprising instructions that, when executed by the processor, cause the apparatus to:

determine, according to the CGI of the neighboring cell and a correspondence between the CGI and a PLMN information set, the PLMN information set corresponding to the neighboring cell.

10. The apparatus according to claim 8, comprising instructions that, when executed by the processor, cause the apparatus to:

determine, according to a PLMN id comprised in the CGI of the neighboring cell and a correspondence between the PLMN id in the CGI and a PLMN information set, the PLMN information set corresponding to the neighboring cell.

11. The apparatus according to claim 8, comprising instructions that, when executed by the processor, cause the apparatus to:

determine, according to a base station id and a cell id that are comprised in the CGI of the neighboring cell and a correspondence between the base station id and the cell id in the CGI and a PLMN information set, the PLMN information set corresponding to the neighboring cell.

12. The apparatus according to claim 8, further comprising instructions that, when executed by the processor, cause the apparatus to:

obtain, according to a PLMN id comprised in the CGI of the neighboring cell and a correspondence between the PLMN id and a first correspondence, wherein the first correspondence is a correspondence between a base station id, a cell id and a PLMN information set, a first correspondence corresponding to the PLMN id comprised in the CGI of the neighboring cell; and determine, according to a base station id and a cell id that are comprised in the CGI of the neighboring cell and the first correspondence corresponding to the PLMN id comprised in the CGI of the neighboring cell, the PLMN information set corresponding to the neighboring cell.

* * * * *